Patented Mar. 16, 1943

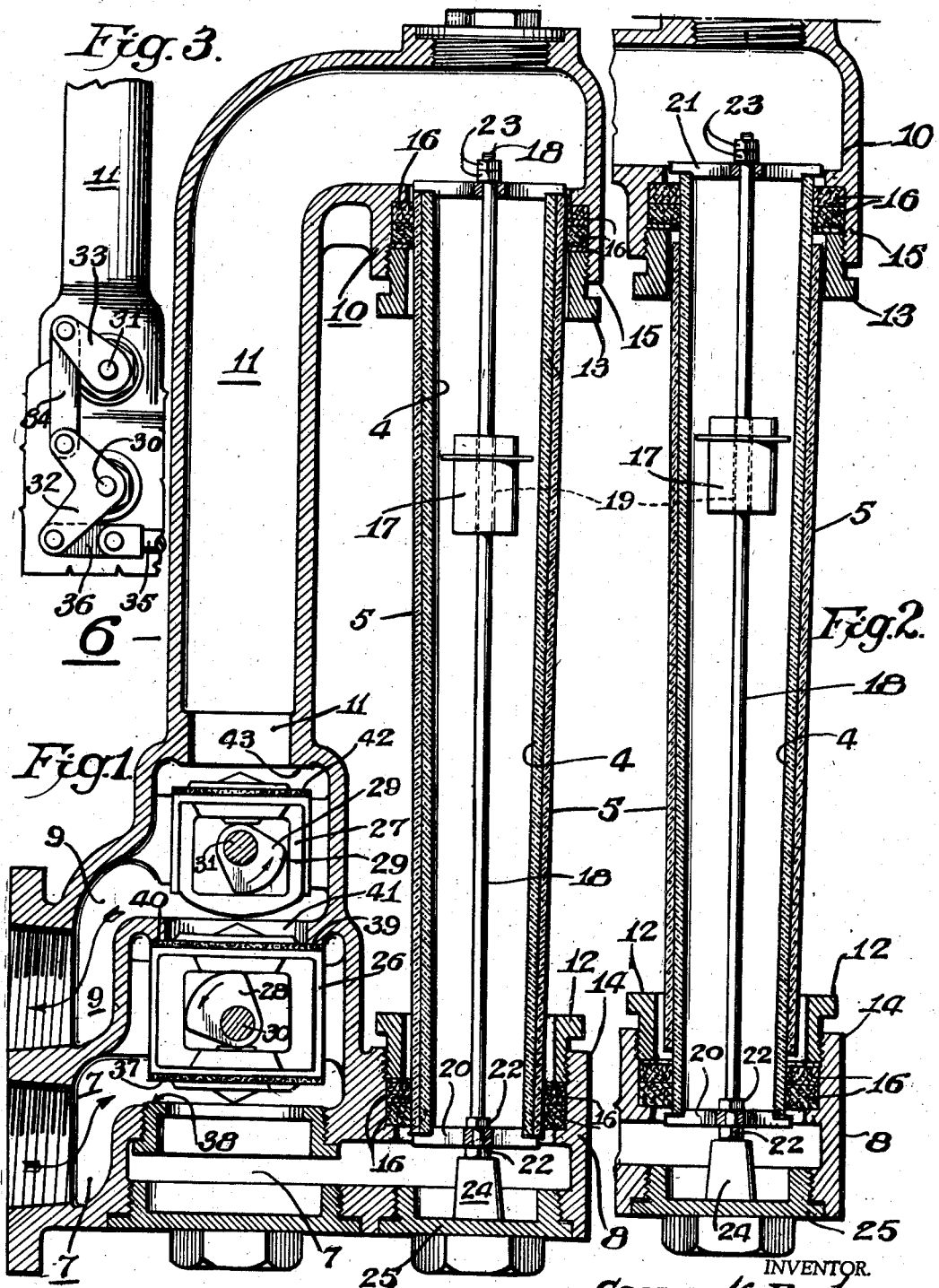

2,313,889

UNITED STATES PATENT OFFICE 2,313,889

ROTAMETER AND THE LIKE

George K. Porter, Hatboro, Pa., assignor, by mesne assignments, to Fischer & Porter Company, Hatboro, Pa., a corporation of Pennsylvania Application August 22, 1941, Serial No. 407,990

7 Claims. (Cl. 73—209)

The present invention relates to flow meters, and more particularly to flow meters of the variable-area type generally known in the trade as rotameters, in which a metering float is adapted to move vertically within a generally vertical metering chamber;—the position of the float being determined by and indicating, the rate at which the fluid flows vertically through the metering chamber.

The object of the present invention is to provide protection for the glass or other fragile or frangible metering tube which constitutes the metering chamber, so as both to protect it against external impacts which would tend to break it, and also to protect the operators and workers in plant attendance against the sudden release of fluids from the metered flow line in the event of a breakage of the glass or other frangible metering tube and to minimize the hazards, as for instance fire hazard, by more or less confining the fluid notwithstanding a breakage or cracking of the glass metering tube, at least until the fluid can be shut off or by-passed around the metering tube.

The present invention is particularly useful where either combustible or explosive liquids or gases are being metered in a flow line, the sudden escape of which in any considerable volume would create a fire hazard, as for instance in gasoline flow lines, or where the liquid gas being metered is hot or corrosive or has poisonous qualities or is a powerful solvent, so that the sudden escape of such gas or liquid in any appreciable quantity, might injure workers or injure adjoining equipment of the plant facilities.

With the above and other objects in view, which will appear more fully from the following specification and accompanying drawing, the present invention consists of a plastic jacketed rotameter tube or metering tube or similar tube through which the gas or liquid in a flow line is adapted to pass, with the plastic exterior being so inwardly related to the inner glass metering tube as to give it protection against external impacts which might otherwise tend to break or crack the glass tube and so as also to firmly confine the glass tube in the event the glass tube cracks for any reason notwithstanding the protective exterior plastic jacket, so as to reduce, to a minimum, the amount of leakage which can result from the cracking of the glass tube, so as to afford a sufficient interval of time to shut off the flow line or by-pass of the glass tube.

The present invention further consists of other novel features all of which will appear more fully from the following description and accompanying drawing and more particularly from the appended claims.

For the purpose of illustrating the invention, there are shown in the accompanying drawing forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawing in which like reference characters indicate like parts, Figure 1 represents a vertical cross-sectional view of a rotameter exemplifying one embodiment of the present invention.

Figure 2 represents a similar though fragmentary vertical cross-sectional view of a modified form of construction exemplifying another embodiment of the present invention.

Figure 3 represents a fragmentary side elevational view (on a reduced scale) of the exterior of the valved portion of the rotameter housing or frame, showing the external valve-actuating mechanism, for operating the by-pass valves shown in cross-section in Figure 1.

According to the present invention the tapered glass metering tube 4 is snugly surrounded by and encased within an outer non-frangible transparent tube 5. The outer protecting tube 5 may be formed of any of the more or less thermoplastic synthetic organic plastics, which are sufficiently transparent to permit good visibility through the composite glass and plastic tube (4 and 5), as for instance the methyl methacrylate polymers, which are available on the market, under the trade names "Plexiglass," "Lucite," as for instance the resins of the phenolic formaldehyde group also available on the market under various trade names such as Catalin, or the outer protective jacket may be formed of other synthetic organic plastics available on the market as "Vinylite," Celluloid and others.

A uniform diametered tube of the plastic material, of suitable wall thickness, as for instance a wall thickness more or less corresponding to the wall thickness of the glass tube, and having an inside diameter the same as perhaps slightly less than the outer diameter of the small end of the glass tube 4, is heated preferably in a bath of ethylene glycol or of highly refined clear mineral oil, to a sufficiently high temperature to make the tube slightly stretchable. The tapered glass metering tube 4 is then forced into the heated plastic tube with the small end of the glass tube leading, so that the tapered glass tube in effect wedgingly expands the plastic tube, as it enters, until the plastic tube is given a taper similar to the taper of the glass tube. Because of the close "fit" of the glass within the plastic, the heating fluid, whether it is ethylene glycol or mineral oil, is seemingly scraped or squeegeed off the inner surface of the plastic tube, so that when the glass tube has been completely forced into the plastic tube, there will be no liquid layer or practically no liquid layer between the contiguous surfaces of glass and plastic. Upon cooling, the plastic tube shrinks slightly so that it becomes tight on the glass tube 4 and thereby establishes more intimate contact between glass and plastic.

Figure 1 illustrates, in vertical cross-section, one form of rotameter embodying the present invention, a form suitable for measuring rate-of-flow of gasoline to engines and includes a generally tubular integral frame 6 having an inlet 7 leading to the lower tube-receiving head or socket 8 of the rotameter, and having an outlet 9 communicating with the upper tube-receiving head or socket 10 of the rotameter through the communicating passageway 11.

The rotameter tube is sealed, at its two ends, in the tube-receiving sockets or heads 8 and 10 of the rotameter, by suitable annular stuffing glands 12 and 13 screw-threaded into similar stuffing boxes 14 and 15 formed integrally with the heads 8 and 10, respectively;—compressing any suitable annular packing rings or sealing members 16 so as to force them, radially, against the metering tube, to seal the same within the heads.

The rotameter float or metering float 17 of the rotameter is preferably guided by a guide rod or wire 18, passing freely through a central axial hole 19 through the metering float 17;—the guide wire in turn being held in coaxial relationship to the metering tube by the lower and upper three-spoked spacing spiders 20 and 21, respectively, which derive their support from the ends of the metering tube, and through the central hub portions of which the ends of the guide wire or rod 18 extend;—held in place by screw-threaded nuts 22 and 23, the lowermost nut 22 resting on the central projection 24 carried by a screw plug 25 at the bottom of the head 8. This screw plug 25 also serves the purpose of providing an opening at the bottom through which the metering tube may be removed and inserted.

A pair of co-ordinated by-pass valves may be provided in the inlet 7 and outlet 9, as shown particularly in Figures 1 and 3, whereby the liquid passing through the rotameter may be by-passed directly from the inlet 7 to the outlet 9, without going through the metering tube, and with the inlet 7 and outlet 9 shut off from communication with the metering tube or the heads 8 and 10 in which the metering tube is held.

The by-pass valves shown in the drawing include a pair of more or less similar movable frame-like or yoke-like valve members 26 and 27, each arranged for vertical up and down motion, within which the rotatable cams 28 and 29 are disposed, carried by their respective operating shafts 30 and 31, which extend to the outside of the housing, through suitable stuffing glands, as indicated in Figure 3, and to the outer ends of which the operating arms 32 and 33 are affixed, connected by the connecting link 34 and operated by a push and pull motion of any suitable operating rod 35, connected to the lower end of the bell-crank arm 32 by another suitable link 36.

The lower movable valve frame 26 carries a lower valve face 37 which is adapted to cooperate with the stationary valve seat 38 when the metering tube is to be by-passed, and an upper valve face 39 adapted to cooperate with the upper stationary valve seat 40 when the metering tube is in the line so as to close the by-pass opening 41 between the inlet 7 and the outlet 9. The upper valve frame 27 has only a valve face 42, which is adapted to cooperate with the stationary valve seat 43, to shut off the upper tube-receiving head 10 of the rotameter frame from the outlet 9, when the tube is to be by-passed.

The simultaneous rotation of the cams 28 and 29 into the position shown in the drawing maintains the valves in the position shown in the drawing which is the normal or operating or "in-line" position, while rotating the cams in the direction of the arrows shown, lowers the lower valve frame 26 and raises the upper valve frame 27 to shut off the head 8, from the inlet 7 and to shut off the head 10 from the outlet 9 and to unseat the valve face 39 from the valve seat 40 and thus open the by-pass opening 41.

In the embodiment of the invention shown in Figure 1, the plastic jacket 5 is shown as extending substantially the full length of the glass tube, and into the packing rings 16.

In Figure 2, a modified form of construction is shown, namely, in which the plastic jacket 5 does not extend to the extreme ends of the glass tube, but in which the ends of the glass tube are left uncovered, so that they may be contacted by the packing rings or materials 16.

The full-length plastic jacket shown in Figure 1 has the advantage of giving fuller protection to the glass and preventing all leakage in case the glass cracks, and is preferable wherever the fluid being metered will not attack or soften the plastic material of which the jacket is made. Where the fluid is such as somewhat deleteriously to affect the material of which the plastic jacket is made then the form of construction shown in Figure 2 is preferable, because the seal is made directly against the glass.

If the metering or indicating graduations, against which the height of the metering float is gauged, are to be carried by the metering tube, then, in the composite glass-and-plastic metering tube of the present invention, the graduation lines indicating numerals and other indicia are preferably etched onto the outer surface of the tapered glass tube before the plastic jacket is applied, and are suitably filled with a colored filler to make them suitably conspicuous, and then the plastic jacket is applied over the graduations and numerals so that the latter are covered thereby, thus serving further to protect the graduations and numbers which otherwise tend to become obliterated, in time, by the loss of the colored filler therein. In this manner, the graduations and markings on glass are also made more permanent.

The present invention may be embodied in other specific forms without departing from the spirit or essential attributes thereof, and it is therefore desired that the present embodiments be considered in all respects as illustrative and

I claim:

1. A composite indicator tube comprising an inner tapered glass tube and an outer tapered tube of a non-frangible synthetic organic transparent material, with the contiguous surfaces of said tubes in intimate contact with each other whereby said outer non-frangible tube protects and supports said inner glass tube against breakage resulting from stresses occurring within and without said inner glass tube.

2. A flow meter including a transparent metering tube of chemically resistant and relatively frangible material and an outer transparent jacket intimately surrounding said metering tube, said jacket being relatively less frangible than said metering tube and forming therewith a two-ply transparent metering assembly having a chemically resistant inner metering surface and having a relatively durable and relatively infrangible outer surface, said outer jacket protecting and supporting said tube against breakage resulting from stresses occurring within and without said tube.

3. A flow meter for measuring rate-of-flow of fluid including a glass metering tube and a transparent outer protective coating intimately associated with said metering tube, said coating being relatively elastic and relatively infrangible thereby to protect said metering tube from breakage resulting from stresses arising inside of or outside of said tube and to prevent accidental escape of fluid from said flow meter.

4. A flow meter for measuring rate-of-flow of fluid including a generally vertical tapered transparent metering tube of chemically resistant and relatively frangible material, said metering tube being adapted for passage of fluid vertically therethrough; an outer correspondingly tapered coating intimately associated with said metering tube, said coating being of relatively elastic and relatively less frangible material than said metering tube and being adapted to protect said metering tube against breakage resulting from stresses arising inside or outside of said tube; a vertically-movable metering float disposed within said metering tube; and a terminal fitting disposed at each end of said metering tube in fluid-tight sealing relationship therewith.

5. A flow meter for measuring rate-of-flow of fluid including a generally vertical transparent metering tube of chemically resistant and relatively frangible material, said metering tube being adapted for passage of fluid vertically therethrough; an outer transparent coating intimately associated with said metering tube and generally co-extensive therewith, said coating being of relatively elastic and relatively less frangible material than said metering tube and being adapted to protect said metering tube against breakage; a vertically-movable metering float disposed within said metering tube; a terminal fitting at each end of said metering tube; and means providing a fluid-tight sealing relationship between said terminal fittings and said coating.

6. A flow meter for measuring rate-of-flow of fluid including a generally vertical tapered transparent metering tube of chemically resistant and relatively frangible material, said metering tube being adapted for passage of fluid vertically therethrough; an outer correspondingly tapered transparent coating intimately associated with said metering tube, said coating terminating somewhat short of the ends of said metering tube; said coating being of relatively elastic and relatively less frangible material than said metering tube and being adapted to protect said metering tube against breakage resulting from stresses arising inside or outside of said tube; a vertically-movable metering float disposed within said metering tube; a terminal fitting at each end of said metering tube; and means providing a fluid-tight sealing relationship between each fitting and the uncoated ends of said metering tube.

7. A flow meter for measuring rate-of-flow of fluid including a generally vertical tapered glass metering tube and an outer correspondingly tapered transparent coating of synthetic organic material intimately surrounding said metering tube, said outer coating being intimately and uniformly secured to said metering tube and being relatively more elastic and relatively less frangible than said metering tube, thereby to protect said metering tube from breakage resulting from stresses arising inside or outside of said tube.

GEORGE K. PORTER.